US012338317B2

(12) United States Patent
Jensen et al.

(10) Patent No.: US 12,338,317 B2
(45) Date of Patent: Jun. 24, 2025

(54) RESINS DERIVED FROM RENEWABLE SOURCES AND STRUCTURES MANUFACTURED FROM SAID RESINS

(71) Applicant: BIO BOND APS, Aarhus C (DK)

(72) Inventors: Martin Jensen, Aalborg (DK); Thomas Brorsen Pedersen, Aarhus C (DK)

(73) Assignee: BIO BOND APS, Aarhus (DK)

( * ) Notice: Subject to any disclaimer, the term of this patent is extended or adjusted under 35 U.S.C. 154(b) by 894 days.

(21) Appl. No.: 16/607,483

(22) PCT Filed: Apr. 24, 2018

(86) PCT No.: PCT/EP2018/025127
§ 371 (c)(1),
(2) Date: Oct. 23, 2019

(87) PCT Pub. No.: WO2018/197050
PCT Pub. Date: Nov. 1, 2018

(65) Prior Publication Data
US 2020/0140606 A1 May 7, 2020

(30) Foreign Application Priority Data
Apr. 26, 2017 (EP) .................................... 17020184

(51) Int. Cl.
| | |
|---|---|
| *C08G 63/08* | (2006.01) |
| *C08G 63/42* | (2006.01) |
| *C08G 63/91* | (2006.01) |
| *C08J 5/24* | (2006.01) |
| *C09J 167/04* | (2006.01) |
| *C09J 167/02* | (2006.01) |

(52) U.S. Cl.
CPC .............. *C08G 63/08* (2013.01); *C08G 63/42* (2013.01); *C08G 63/912* (2013.01); *C08J 5/244* (2021.05); *C08J 5/245* (2021.05); *C08J 5/247* (2021.05); *C08J 5/249* (2021.05); *C09J 167/04* (2013.01); *C08J 2367/02* (2013.01); *C08J 2367/04* (2013.01); *C09J 167/02* (2013.01)

(58) Field of Classification Search
CPC ........ C08G 63/08; C08G 63/42; C08G 63/60; C08G 63/912; C08J 5/24; C08J 167/02; C08J 167/04; C08J 2367/02; C08J 2367/04
See application file for complete search history.

(56) References Cited

U.S. PATENT DOCUMENTS

| | | | |
|---|---|---|---|
| 5,180,765 A | * | 1/1993 | Sinclair .................. C08K 5/101 524/320 |
| 7,897,168 B2 | | 3/2011 | Chen et al. |
| 8,076,406 B2 | | 12/2011 | Brule et al. |
| 8,563,664 B2 | | 10/2013 | Seppala |
| 8,993,705 B2 | | 3/2015 | Dorgan et al. |
| 2004/0068059 A1 | * | 4/2004 | Katayama .............. C08G 63/60 525/466 |
| 2009/0093575 A1 | * | 4/2009 | Kabashima ............. C08L 67/07 525/450 |
| 2009/0027576 A1 | | 11/2009 | Sodergard et al. |
| 2010/0075878 A1 | | 3/2010 | Gizaw et al. |
| 2014/0080992 A1 | | 3/2014 | Olsson et al. |

FOREIGN PATENT DOCUMENTS

| | | | | |
|---|---|---|---|---|
| EP | 3162833 | | 5/2017 | |
| JP | 2013221096 A | * | 10/2013 | ................ C08J 3/00 |
| WO | WO93/10169 | | 5/1993 | |
| WO | WO2006053936 | | 5/2006 | |
| WO | WO2012041521 | | 4/2012 | |
| WO | WO2013017895 | | 2/2013 | |

OTHER PUBLICATIONS

ThermoFisher; Glycidyl Methacrylate Safety Data Sheet, 2021, p. 1-12.*
Oscar Valerio et al: "Synthesis of Glycerol-Based Biopolyesters as Toughness Enhancers for Polylactic Acid Bioplastic through Reactive Extrusion", ACS Omega, vol. 1, No. 6, Dec. 31, 2016 (Dec. 31, 2016), pp. 1284-1295.
International Search Report issued in PCT/EP2018/025127, dated Jul. 25, 2018.
Valerio, et al., "Synthesis of Glycerol-Based Biopolyesters as Toughness Enhancers for Polylactic Acid Bioplastic through Reactive Extrusion", ACS Omega 2016, 1, 1284-1295, Dec. 2016.
Du et al., "Styrene-Assisted Maleic Anhydride Grafted Poly(lactic acid) as an Effective Compatibilizer for Wood Flour/Poly(lactic acid) Bio-Composites", Poylmers, 2017, 9, 623. Nov. 21, 2017.

* cited by examiner

*Primary Examiner* — Alicia Bland
(74) *Attorney, Agent, or Firm* — Maschoff Brennan

(57) ABSTRACT

In the present invention a family of preferably bio-based resins is disclosed. The resins exhibit a broad range of applicability in terms of suitable processing techniques. The resins are designed in a manner that allows the introduction of functional in the resin backbone capable of providing adhesion towards reinforcements. The invention also relates to specimen manufactured with said resin.

18 Claims, No Drawings

RESINS DERIVED FROM RENEWABLE SOURCES AND STRUCTURES MANUFACTURED FROM SAID RESINS

FIELD OF THE INVENTION

The present invention relates to a group of resins that preferably are biobased and degradable in nature and are applicable with a broad range of processing techniques and applications. The invention also relates to structures containing said resins.

BACKGROUND OF THE INVENTION

The use of polymers has been growing steadily for decades and this growth is predicted to continue for the coming years. The vast majority of polymers produced today have their origin in molecules derived from components in crude oil. As a result hereof, these polymers constitute two major environmental concerns: First, after end use, incineration of the polymers releases $CO_2$, which contributes to increasing $CO_2$ levels in the atmosphere. Second, most of these crude oil based polymers lack degradability in nature and thus if these polymers are not collected for incineration they end up in nature as waste polluting oceans, forests and recreational areas. Also some of the crude oil based polymers contain molecules or chemical moieties that can have detrimental effects on human health such as endocrine disruptors as bisphenols and phthalates. Avoiding or reducing these effects on the environment and human health is desirable.

Polymers are used in a very broad range of applications that among others include electronics, packaging, construction, matrix in composite materials, adhesives between components and internal adhesive in for instance fibreboards, hereunder chipboards. Owing to their broad ranges of applicability, polymers must possess differences in their chemical, physical and mechanical properties, which can be obtained through variation of the chemical composition of the polymer or alternatively by mixing two or more polymers. Hence, the possibility to alter the chemical composition of a polymer and the ability to mix it with other polymers is advantageous as it enables the use of the polymer or derivatives of the polymer to be utilised in a broader field of applications and provides the possibility to tailor the properties of the polymer to a desired application.

In some of the polymer applications mentioned in the above, such as the matrix in composite materials and internal adhesive, the polymer structure is together with another part or parts forming the overall structure. As an example hereof, wood chips are wetted with a solution containing monomeric and oligomeric molecules that react to form the polymer and simultaneous forms an adhesion to the wood chips. It is therefore further advantageous if the polymer can be based on monomers and/or oligomers that can react internally and with an external part such as wood, fibres and metals.

A common approach to describe both polymers that can be used without further reactions and a monomer, oligomer, polymer or mixtures hereof that require further reaction is resin. In the following resin shall constitute both compositions that require further polymerisation and compositions that can be used without further polymerisation. The resin can be in gaseous, liquid and solid state.

Poly (lactic acid) from here on abbreviated PLA, is a polymer derived from biological sources and is not known to impact human health. U.S. Pat. No. 8,076,406 provides an example of a composite material with PLA as a matrix that also contains polyamide and functionalised polyolefin that are both crude oil derived, which limits the $CO_2$ benefit of the composite and makes the composite structure non-degradable in nature. U.S. Pat. No. 8,993,705 and WO2013/017895, describe use of PLA with lignin and saccharides, respectively, to obtain a structure that can have a high content of molecules with a biological origin and that can degrade in nature. PLA, however, has two drawbacks. First, it has a high viscosity which is disadvantageous in terms of processing speed and strongly complicates its use in larger structures and structures with a high fibre content. Second, the PLA molecular chain does not contain any reactive groups in its backbone and therefore the only reactive groups are the chain terminal ones. The absence of reactive groups in the polymer backbone reduces it adhesion to other materials and limits the possibilities to graft other molecules on to the PLA backbone in order to modify its properties. To overcome the high viscosity, lignin can be reacted with the monomer of PLA, lactide, as described in US2014/0080992. This approach necessitates cure of the lactide to PLA, which gives a long processing time and lignin in itself is viscous.

WO2006053936 describes the creation of a polymer from hydroxy acids comprising at least 60% of the polymer by mole and diols. Lactic acid is a preferred hydroxy acid for the polymer. Since lactide is considered disadvantageous in the invention, the polymer is formed through a condensation reaction, which is disadvantageous in composites as the condensation releases water which can lead to low molecular weight of the polymer and voids inside the composite structure. Both the low molecular weight and the presence of voids reduce the mechanical performance. Further, hydroxyl and carboxylic acid groups in the polymer structure are considered disadvantageous giving the polymer limited adhesion to other parts.

For PLA, brittleness is a general problem. US2009/0275706 teaches a toughening for PLA by blending it with another polymer that can be partly or fully bio-based. As two polymers are blended, the polymer will have a high viscosity causing the undesired effects described in the above and due to the lack of reactive groups in the PLA backbone the number of covalent bonds between the two polymers is limited.

Other examples of bio-based polymers containing other molecules than PLA have also been reported. In WO2012/041521 a biobased plate with 2 sheets of paper is manufactured by means of a furan based biopolymer. In US2010/075878 a lignin based polymer is disclosed. The polymer has a large molecular weight and thus has a high viscosity.

In U.S. Pat. No. 7,897,168, a copolymer made from lactide and γ-butyrolactone and containing a drug for medical purposes is disclosed. The introduction of reactive groups in the polymer is not described.

WO9310169 teaches a method for obtaining PLA with reactive groups in the backbone. It describes reacting at least 90 mol % of lactic acid with another carboxylic acid in a condensation reaction. The disadvantage of this approach is that the condensation reaction releases water that can hydrolyse the ester bond in the polymerised structure, which leads to low molecular weight polymers and concomitantly lower mechanical properties compared to said polymer with a higher molecular weight.

In Valerio et al 2016 Synthesis of glycerol-based polyesters as toughness enhancers for polylactic acid bioplastic through reactive extrusion, a method for obtaining a toughened PLA polymer by grafting another polymer onto the PLA backbone in an extrusion process. As two polymers are mixed, both the individual polymers and the product after grafting have a high viscosity. The high viscosity makes polymers synthesised through this approach unsuitable for processing techniques such as resin transfer moulding and spraying. Further, the degree of grafting is very low, as it is reported only 1.5% of the other polymer has been grafted onto the PLA backbone. The authors report that the toughening effect of the other polymer strongly depends on the distribution of the other polymer in the PLA and this distribution is strongly enhanced by grafting. Hence, it is advantageous to identify a processing method that leads to a higher degree of grafting.

In EP15020214, a resin containing at least 50% lactide or PLA oligomers is disclosed. The document teaches the use of cross linkers and modifiers that can be applied. The incorporation of reactive groups within the resin network is not described.

SUMMARY OF THE INVENTION

The present invention relates to a group of resins where chemical molecules can be incorporated into and onto the backbone and resins with reactive groups in their backbone and structures manufactured using said group of resins. The invention covers resins with various degrees of polymerisation, which implies from resins solely containing monomers to fully polymerised resin where no further cure is necessary.

As used herein, the term lactic acid refers to L-lactic acid, D-lactic acid and mixtures hereof. It refers to both neat lactic acid and solutions, emulsions and dispersions containing lactic acid.

As used herein, the term lactide refers to any of the isomeric states of L-lactide, D-lactide and meso-lactide (also referred to as D,L-lactide) or mixtures hereof. Also it refers to any crystallinity states.

As used herein, the term poly (lactic acid), abbreviated PLA, refers to any of the isomeric states of poly (L-lactic acid), poly (D-lactic acid) and poly (L,D-lactic acid) or mixtures hereof. The term mixtures also includes both random mixing of any of the isomeric states and scenarios where one or a mixture is coated with another or mixture of isomeric states. Also it refers to PLA with any degree of crystallinity, molecular weight and any geometrical shape such as, but not limited to pellets, films and fibres.

As used herein, the term monomer refers to a molecule that can undergo polymerisation. A monomer can react with the same monomer molecule to yield a another molecule that can also be termed a monomer. An example hereof is lactic acid that through condensation can react to lactide. Both lactic acid and lactide can be used as building blocks for the synthesis of poly lactic acid and are thus both termed monomer.

For molecules with one or more unsaturated carbon double bonds, the name of the molecules refers to both cis and trans enantiomers and combinations hereof unless otherwise specified.

For molecules containing one or more chiral carbon atoms, the name of the molecule refers to both L and D enantiomers and combinations hereof unless otherwise specified.

Broadly, in accordance with one aspect of the invention, the resin comprises a first composition of: 2-99.99% by weight of monomers capable of forming cyclic monomers and/or cyclic monomers and/or oligomers and polymers from said monomers, where the monomers are capable of forming one or more of the following components: lactones, lactames, lactimes, dicyclic esters, cyclic esters, cyclic amides, cyclic aromatic sulphides, cyclic carbonates, 1,5-dioxepan-2-one or cyclic aromatic disulphides, where the oligomers are produced by of one or more of said components, and where the polymers are produced from one or more of said components or lactones, lactames, lactimes, dicyclic esters, cyclic esters, cyclic aromatic sulphides, cyclic carbonates, 1,5-dioxepan-2-one, cyclic aromatic disulphides or other molecules that are capable of undergoing ring opening polymerisation. Examples of monomers that can form lactones and dicyclic esters include lactic acid, modified lactic acid, glycolic acid and cyclohexanone with peracetic acid. Suitable lactones and dicyclic ester can comprise, but is not limited to, lactide, modified lactide, glycolide, γ-butyrolactone, β-butyronaltone, γ-valerolactone and ε-caprolactone. Suitable cyclic carbonates and lactames are trimethylene carbonate, ethylene carbonate, propylene carbonate and e-caprolactame, respectively. In order to limit the extent of condensation reactions that can lead to low molecular weight and generation of water induced voids and concomitantly poor mechanical performance in structures containing the resin, the content of hydroxy acids is not above 50% by mole, preferably below 40% by mole. The oligomers are preferably consisting of 2-100 monomers as structures larger than 100 monomers in this invention are considered as polymer. Suitable polymers can be PLA, modified PLA, poly glycolic acid, poly caprolactone, poly (lactic-co-glycolic acid) and poly (lactic acid-co-caprolactone), and comprising a second composition of: 0.01-98% by weight of molecules capable of copolymerising or grafting with one or more of said components of the first composition and simultaneously preferably having at least one other reactive chemical group or oligomers or polymers containing said molecules. Examples are molecules that can undergo ring opening polymerisation, molecules that have an unsaturated carbon bond, molecules containing one or more isocyanate group, molecules containing one or more carboxylic acid groups, molecules containing one or more hydroxyl groups, molecules containing one or more anhydride groups, molecules containing one or more amine groups and molecules containing one or more epoxy groups.

In preferred embodiments the first composition constitutes 10-99.99% by weight and the second composition constitutes 0.01-80% by weight, more preferably the first composition constitutes 25-99.99% by weight and the second composition constitutes 0.01-50% by weight, most preferably the first composition constitutes 60-99.99% by weight and the second composition constitutes 0.01-30% by weight.

In preferred embodiments, at least 40% by weight of the sum of first composition and the second composition originate from a renewable origin, more preferably at least 60% by weight and most preferably at least 75% by weight. By renewable origin is understood a naturally occurring resource which replenishes to overcome resource depletion through either biological reproduction or other natural reoccurring processes within the human time scale. Examples hereof are plants, animals and minerals and inorganic substances released through volcanic eruptions or other naturally occurring events such as creation of limestone through atmospheric carbon dioxide.

The invention covers the resin in any state, which implies solid, liquid, dispersion, suspension, solution, emulsion and gaseous state. For solid state, the state can attain any geometry such as granule, pellet, flake, fibre, yarn, film, powder and foam.

In preferred embodiments of the invention, the first and second composition or parts hereof are reacted to together to yield the resulting resin or are reacted together and subsequently mixed together or further reacted with additional parts of either the first or second composition. By first allowing the first and second composition to react partly or fully, an enhanced degree of the reaction between the two compositions is reached compared to prior art. Since chemical linkages between the two compositions provide better compatibility between the phases, and thus final resin performance, than physical blending, the approach is preferred in various embodiments.

The invention also relates to chemical compositions that contain monomers, oligomers and polymers not capable of copolymerising with one or more of the components in the first composition and the second composition as such components can be used to modify the properties of said composition. Examples include poly ethylene glycol, poly propylene glycol, poly propylene, modified polypropylene such as methacrylated poly propylene, poly ethylene terephthalate, BASF Ecoflex, Biomax Strong from Dupont, ABS, latex, styrenated phenol, starch, modified starch, poly hydroxyalkanoates, poly butylene succinate, saccharides, furanoses, cyclodextrins and lignin.

In other aspects of the invention, the resin contains fibres or fibrous material with a length of 0.001 to 500 mm, more preferably 0.01 to 50 mm, most preferably 0.05 to 10 mm By "fibre" and "fibrous material" it is referred to a geometry or a material with a geometry where one dimension is significantly longer than the other or in other words a material with a high aspect ratio. For materials with a cylindrical shape this implies that the length of the object is significantly longer than the diameter and for rectangular objects, the length in one or two of the dimensions is significantly larger than the other dimension(s).

A resin composition can contain one or more types of fibres and these can include but are not limited to flax, jute, hemp, kenaf, straw, switchgrass, hay, bamboo, coconut, palm leaves, pulped banana stem, cotton, wool, seaweed, seagrass, eel grass, algae, chicken feathers, shredded wood, glass, carbon, aramid, ceramic, poly propylene, poly ethylene, poly ethylene terephthalate, polyamide such as nylon, poly lactic acid, copolymer and bicomponent fibres. The amount of fibre relative to the resin component is 0 to 95 volume percent, preferably 10-85 volume percent. The use of fibres in some aspects of the invention is advantageous as they can modify the mechanical properties of the neat resin by acting as a loading bearing element.

In another plurality of aspects of the invention, the resin contains one or more fillers. These fillers have a size of 0.001 to 100 mm, preferably 0.001 to 5 mm and can attain any geometrical shape. Examples of suitable fillers include, silica, micro silica, calcium sulphate, hydrated forms of calcium sulphate, calcium carbonate, hydroxyapatite, talc, glass, sand, gravel, granite, stone, aluminium oxides, aluminium hydroxides, ceramics and seeds from e.g flax, rye, grape and sunflower.

In further aspects of the invention, the resin contains micro or nano sized filler, which implies fillers with a size between 1 and 50,000 nano meters, more preferably 10-10,000 nano meters. Examples of such fillers include nano clay such as montmorillonite, nano silica, graphene, graphene oxide, carbon nanotubes and nano cellulose. The nano fillers can be added to enhance the toughness of the resin mixture.

In preferred embodiments of the invention, the second composition of the resin contains a molecule with at least one carbon double bond and at least one more reactive group. In some preferred embodiments of the invention, said reactive group is located at the alpha, beta or gamma position according to the double bond and is electron withdrawing such as a carboxylic acid, ester, carbonyl and anhydride. Examples of such molecules include but is not limited to maleic acid, itaconic acid, aconitic acid, aconitic anhydride, muconic acid, glutinic acid, traumatic acid, fumaric acid, acrylic acid, methacrylic acid, crotonic acid, sorbic acid, citraconic acid, mesaconic acid, 2-pentenic acid, cinnamic acid, vinyl cinnamate, cinnamyl cinnamate, caffeic acid, ferulic acid, coumaric acid, sinapic acid, butyl methacrylate, butyl acrylate, anhydrides, esters, amides and imides of the mentioned acids. In other embodiments, said molecule contains a carbon double bond and at least one alcohol group such as ethenol, propenol, 1,3-dihydroxy propenol, 2-butenol, coumaryl alcohol, coniferyl alcohol, sinapyl alcohol and esters and ethers of the mentioned alcohols. In other embodiments, said molecule contains a carbon double bond and one or more amine groups or at least one amine group and one more reactive group.

In other preferred embodiments of the invention, the second composition contains one or more cyclic molecules with one or more reactive groups. Examples of suitable molecules are glucono delta-lactone, modified glucono lactone such as partly estrified glucono lactone, methacrylated glucono lactone, partly acetylated glucono lactone, glucuronolactone, γ-methyl-α-methylene-γ-butyrolactone, α-methylene-γ-butyrolactone, 2,5-morpholinedione and 3-hydroxybutyrolactone.

In some preferred embodiments of the invention, especially embodiments where the resin is present in a monomeric or low polymerised state, the first composition and/or the second composition contain one or more molecules with a melting point below 70° C., preferably below 60° C., most preferably below 30° C. in order to decrease the melting point of the resin mixture. Suitable molecules are eugenol, isoeugenol, (hydroxyethyl)methacrylate, safrole, γ-butyrolactone, ε-caprolactone, trimethylene carbonate, estragole, anethole, ethyl cinnamate and methyl methacrylate although other molecule are also applicable as known to the skilled artisan.

The hydrophilicity of the resin can be tailored by varying the ratio between the first composition and the second composition, by selecting different molecules within the first composition and the second composition and by varying the ratio between the chemical constituents in the first composition and the second composition. As an exemplification, a more hydrophilic resin is obtained if the first composition contains lactide rather than e-caprolactone and if the second composition contains itaconic acid rather than methacrylic acid. Also a resin consisting of 85% lactide and 15% itaconic acid is more hydrophilic than resin comprised of 95% lactide and 5% itaconic acid. The hydrophilicity of the resin can be adjusted to enhance the compatibility between the resin and certain fibre types and substrates onto which the resin should be used as coating and materials to which the resin will act as an adhesive. Therefore, in some applications a high hydrophilicity is advantageous and in other applications a low hydrophilicity is advantageous and thus control of the resin hydrophilicity is a desirable feature of the invention.

In some aspects of the invention, the resin contains one or more cross linkers. Through the use of cross linkers, the rigidity of the polymerised resin network can be increased, which can be applied to increase the glass transition temperature, strength and stiffness of the polymerised resin. By the term cross linker is understood a molecule capable of chemically reacting with one or more chemical groups in either the first composition or the second composition or through copolymerisation with one or more components in the first composition and/or the second composition form cross links and thereby connect polymer chains. The cross linker should contain at least two reactive chemical groups capable of undergoing reaction with any of the components in the first composition or the second composition or through copolymerisation or grafting be able to form a connected polymer network such as molecules with at least two unsaturated carbon double bonds or molecules capable of undergoing ring opening polymerisation meanwhile having at least one unsaturated carbon double bond. In some advantageous embodiments of the invention, the cross linker can undergo chemical reaction with one or more components present in the second composition. Examples of reactive chemical groups capable of reacting with components in the second composition and capable of being part of the cross linking molecule include, but is not limited to, amines, carboxylic acids, unsaturated carbon bonds, hydroxyls, isocyanates, oxiranes, anhydrides and carbonyls. The choice of appropriate reactive group in the cross linker depends on the reactive groups present in the first composition and the second composition as known to those skilled in the art. Suitable cross linkers include among others amino acids, peptides, fatty acid derived amines such as coco amine, oleyamine, tallow amine, soya amine and lauryl amine, 1,4-bis(2,3-epoxypropoxy)butane, bisphenol A glycidyl ether, methylene diphenyl diisocyanate, toluene diisocyanate, 1,4-butanediol, itaconic acid, maleic acid, 2,5-furandicarboxylic acid, malonic acid, oxalic acid, adipic acid, tartaric acid, mellitic acid, mandelic acid, lactic acid, malic acid, gallic acid, vanillic acid, terephthalic acid, aconitic anhydride, maleic anhydride, itaconic anhydride, phthalatic anhydride, trimellitic anhydride, pyromellitic anhydride, glycerol, xylitol, ethylene glycol, bisphenol A, bisphenol F, bisphenol S, isophorone diamine, jeffamines, diamino diphenyl methane, diethyl toluene diamine, diamino diphenyl sulphone, methyl diamino cyclohexane, diamino cyclohexane. Examples of molecules capable of crosslinking the polymer network through a copolymerisation and/or grafting step are cinnamyl cinnamate, vinyl cinnamate, α-methylene-γ-butyrolactone and isoprene. In preferred embodiments, at least part of the cross linking molecules or some of the cross linking molecules originate from a renewable source.

To further enhance the application span of the resin, said resin in some embodiments contains a flame retarder as flame retardancy is a regulatory requirements for some resin containing products. The flame retarder can react with one or more components in the first composition or the second composition or alternatively any crosslinker, filler, fibre other component in the resin. In preferred embodiments, the flame retarder is halogen free. An example of a class of such molecules is phosphorous containing ones such as amine functionalised phosphoric amides, hydroxyl functionalised phosphoric amides, aryl phosphates, ammonium polyphosphates, and amine functionalised phosphoric esters. In other advantageous embodiments of the invention, the flame retarder is a silicon containing molecule such as silanes as for instance, tetraethyl orthosilicate, tetramethyl orthosilicate and aminopropyltriethoxysilane. Spirocyclic pentaerythritol bisphosphate disphosphoryl melamine, organomodified silicates, ethyl phosphorodichloridate, aryl polyphenylphosphonates, spirocyclic pentaerythritol bisphosphate disphosphoryl melamine are also suitable flame retarders. In other aspects of the invention, the flame retarder is an inorganic molecule as aluminium hydroxides, zinc borates and sodium tetraborate and hydrated forms of said two molecules.

Polymers degradable in nature are desirable, but for polymers applied under outdoor conditions, degradability can be undesirable to the usage of the polymer containing product. To overcome this application barrier, the resin in some embodiments contains one or more molecules capable of impeding degradation by organisms found in nature such as fungicides, pesticides, antibacterials and antibiotics. A large selection of commercially available options for said molecules are available and compatibility between the resin and already available molecules and synthesisable molecules with degradation impedance effect can be assessed by those skilled in the art. In preferred embodiments, the organism degradation impedance is obtained by utilising environmentally friendly products such as tea tree oil, citronella oil, cinnamaldehyde, oregano oil, rosemary oil, kelp, bacillus subtillis and sodium bicarbonate. The choice of molecule or substance in the resin to improve its resistance in natural environments can be tailored to the bacterial and fungal strains present around the application site of the product containing polymer made from resin of the present invention.

Another property important for certain polymer applications is UV stability. For resin compositions where inherent UV stability is below the required level, the UV stability can be increased by adding one or more antioxidants or UV absorbers to the resin composition. To improve the UV stability of products containing the resins of this invention, molecules such as hindered amine light stabilisers, oxanilides, benzophenones, benzotriazoles, oxalic acid and commercially available blends such as OnCap™ UV stabilizer and CESA®-light can be employed.

In some aspects of the invention, the resin contains one or more antioxidants to stabilise the resin and products containing the resin under oxidising conditions. Preferred antioxidants are originating from a renewable resource such as ascorbyl palmitate, astaxanthin, vitamin c and tocopherols. Suitable antioxidants also include butylated hydroxytoluene, tert-butylhydroquinone and hydroquinone.

To tailor the physical appearance of products manufactured with the resin of this invention, one or more colourants can be added to the resin composition as a dye. The selection of colourants relies on the visual impression characteristics of the end product and the effect of each colourant is known to those familiar with the field and examples include the commercial series Dispersol® and Palanil®. Preferably the colourant originates from a renewable source such as the series of colourants commercially available under the following names Renal®, OnColor™ BIO colorants and Macrolex.

In various embodiments of the invention, the resin contains one or more components capable of liberating a gaseous component upon heating or by chemical reaction with another molecule. The release of gas can create a porous structure of polymers made from the resin, which can have a desirable impact in for instance applications involving insulation or transport protection or for lowering the density of the resin. The span of suitable components is broad as the molecules capable of being liberated as a gas includes molecules that are not gaseous at ambient temperature and pressure such as water. Thus, as to be understood in the present invention the liberated molecules can included, but is not limited to, $H_2O$, $CO_2$, $CO$, $SO_2$ and $NO_2$. Examples of suitable components are citric acid, malic acid, baking powder, isocyanates and sodium bicarbonate.

In various aspects of the invention, the resin comprises one or more nucleation agents. Polymers made form the resin can be present in either amorphous, semi crystalline or fully crystalline state. A fully amorphous polymer will lose it mechanical strength at temperatures above the glass transition temperature (Tg), which is undesirable for applications requiring high temperature stability. For a semi crystalline polymer, said polymers amorphous phase will soften around Tg, whereas its crystalline phase retains its strength up to the melting temperature, which is commonly higher than Tg. Therefore, for a fixed chemical composition of a polymer, a polymer containing crystals retains at least part of it strength at higher temperatures than said polymer in a fully amorphous state. During cooling from the cure or processing temperature of the resin, the degree of crystallinity of the resulting polymer depends on the cooling schedule the polymer is exerted to where a lower cooling rate yields larger probability of introducing crystals than a faster cooling rate. As known to those skilled in the art, the influence of cooling rate from the cure or processing temperature on the crystallization is related to certain temperature domains and not the full temperature interval from cure or processing temperature to ambient temperature. By nucleation agent is understood a substance that allows crystalline structures to form at higher cooling rates than in the absence of the nucleation agent. It is not required that the nucleating leads to a higher obtainable degree of crystallization, although such impact of the nucleation agent is advantageous in some embodiments. As nucleation agents often act as a nuclei for the polymer to crystallise upon, particles not undergoing any internal reactions or forming covalent bonds to the resin or polymer constituents can be applied as nucleation agents, which gives a plurality of possibilities for suitable nucleation agents such as talc, calcium carbonate and barium sulphate. Another example of nucleation agents is substances capable of being mixed with the resin and in some scenarios interact chemically or physically with it or certain constituents of it such as hydrazide compounds and cyclodextrins.

Resins are used in a very broad field of applications, which is reflected in the different nature of commercially available resins as some resins contains monomers and oligomers that require further cure at the resin end user, whereas other resins contain fully polymerized species allowing direct use upon heating with techniques such as injection moulding, film stacking and extrusion moulding. The resins disclosed in the present invention cover resins requiring further cure, over partly polymerised resins to fully polymerised resins to reach a larger application spectrum.

In various aspects of the invention, the resin contains the monomers of the first composition and the second composition and any additional components as mentioned in the above. In advantageous embodiments, said resin is a one component system implying that the resin contains a plurality of chemical constituents and one or more catalysts, initiators or curing agents to initiate and complete the cure of the monomers to polymerise the resin. A one component resin system can be produced by mixing the different chemical constituents of the resin in the liquid state and upon mixing adding the catalysts, initiators and/or curing agents to the mixed chemical constituents through stirring. Shortly after the addition of catalysts, initiators and/or curing agents, the liquid mixture is cooled to a temperature where either the resin, initiators, catalysts or curing agents are unreactive, which implies that the chemical structures in the resin do not undergo or only to a very limited extent undergo polymerisation or other chemical reactions. In other embodiments, said resin is supplied as a 2 component system in which one component contains the chemical constituents that are reactive towards the catalysts, initiators or curing agents and the other component contains the catalysts, initiators and curing agents and potentially any components of the invention not reactive towards the catalysts, initiators and curing agents. Suitable catalysts and initiators depends on the chemical constituents of the resin and are known to those skilled in the art.

In various aspects of the invention, the resin contains monomers, oligomers and/or polymers of the first composition and the second composition, but not solely monomers, so that the resin is partly polymerised and further polymerisation of the resin components is necessary. A one component resin system can be produced by mixing the different chemical constituents of the resin in the liquid state with the catalysts, initiators or curing agents. The chemical components of the resin can be added immediately or stepwise to the polymerisation container. The resin can upon mixing of the components be allowed to undergo further polymerisation, but the polymerisation degrees higher than 95% cannot be obtained since resins with higher polymerisation degrees are considered fully polymerised in this invention. Upon obtaining the desired degree of polymerisation, the liquid mixture is cooled to a temperature where either the resin constituents or the catalysts, initiators or curing agents are unreactive, which implies that the chemical structures in the resin do not undergo or only to a very limited extent undergo polymerisation or other chemical reactions. In alternative embodiments, said resin is supplied as a 2 component system. Such system can be prepared by mixing the different chemical constituents of the resin in the liquid state with the catalysts, initiators or curing agents. The resin can upon mixing of the components be allowed to polymerise further, but duration must be shorter than that to achieve polymerisation degrees greater than 95%.

When the desired degree of polymerisation is obtained, an inhibitor can be added and mixed into the resin, where the inhibitor is one or more molecules that strongly slow down the polymerisation rate or terminate the polymerisation. The amount of inhibitor must correspond to the amount of catalysts, initiators and curing agents present in the resin at the point of adding the inhibitor. Upon mixing the inhibitor into the resin, said resin is cooled and is one part of the two component system. The other part of the two component system contains catalyst, initiator or curing agent and any potentially other components disclosed in the invention.

In various embodiments of the invention, the resin contains fully polymerised constituents of the first composition and the second composition which implies a polymerisation degree of at least 95% and optionally any other component capable of being part of the resin as described in this invention. A one component resin system can be produced by mixing the different chemical constituents of the resin in the liquid state with the catalysts, initiators or curing agents at once or adding the components to the reaction mixture stepwise. The resin is upon mixing of the components allowed to polymerise, where after the resin is made into pellets, granulates, fibres, foam, films or other geometrical shapes. For fibres and other structures that allow the fabrication of said structures consisting of two or more chemically different phases, the present invention also relates to embodiments where the resin covered by the present invention does not fully constitute the full resin content of said structure.

The present invention also relates to neat polymer parts and composite parts made using the resin of the present invention. Under this invention, composite is defined as a material consisting of at least 2 macroscopically different phases. The following are only selected examples of structures capable of being manufactured through the use of the resin of this invention and variations and combinations of the examples can be performed as known to those familiar with the art.

In various embodiments of the invention, the resin or resin blends comprising the resin of this invention is used as a spray able adhesive. The resin can be used to glue various substrates such as natural fibres as wood, shredded wood, hemp, flax, jute, kenaf, coconut, bamboo, sphagnum, cotton, seaweed, eel grass, seagrass, algae, wool, sisal, straw and hay, other fibres such as glass, stone wool, carbon aramid, poly propylene, poly ethylene, poly ethylene terephthalate, poly lactic acid, copolymer fibres, non-fibrous materials such as wood, metal, glass, granite, stone, sand and polymers. Following impregnation of the substrate, the structure comprising the impregnated substrate and any excess resin is shaped into a desired dimension by means of methods such as compression moulding. In embodiments, where the resin is not fully polymerised, a polymerisation step prior and/or subsequent to the shaping step can take place.

In various embodiments, the resin is employed as an adhesive in the manufacture of chipboards, particleboards and fibreboards. In certain embodiments, the resin is mixed with one or more solvents to create a solution, dispersion or emulsion to lower its viscosity as this can ease the processing. Applicable solvents can be but are not limited to water, ethanol, formaldehyde, poly ethylene glycol, poly propylene glycol, lactide and lactic acid esters such as methyl lactate and ethyl lactate. The resin is either sprayed, poured or allowed to flow onto or into or mixed with the shredded wood constituting the chipboard or fibreboard or resin in the shape of pellets, granulates, powder or fibres is mixed with the shredded wood. Following, impregnation of the wood with the liquid resin or mixing of the wood and solid resin, the wood-resin structure undergoes hot pressing as carried out when manufacturing chip, particle and fibreboards using conventional resins.

In various embodiments, the resin is employed as an adhesive in the manufacture of strawboards. The resin is either sprayed, poured or allowed to flow onto or into the straws and/or chopped straws constituting the strawboard or resin in the shape of pellets, granulates, powder or fibres is mixed with the straws. Following, impregnation of the wood with the liquid resin or mixing of the straws and solid resin, the structure undergoes hot pressing as carried out when manufacturing strawboards using conventional resins.

Fibre reinforced composite materials are often manufactured by means of either resin transfer moulding (RTM) or vacuum assisted resin transfer moulding (VARTM) processes. Both processes involve two basic steps: first fabrication of a fibre preform inside a mould with the shape of the finished composite material, where the preform is comprised by a plurality of fibres in most cases present as fabric layers and second impregnation of the preform with a resin. The present invention covers composite structure manufactured by RTM and VARTM using the resin disclosed in this invention.

In RTM processes, the resin is injected into the mould under pressure. In the VARTM process, the resin is drawn into the mould by applying a pressure inside the mould that is lower than the pressure outside the mould. If a partly of fully polymerised resin is used, the resin is injected or drawn into the mould at a temperature above its melting point and upon impregnation of the preform, a temperature reduction will cause the resin to solidify and constitute the matrix of the composite material. For thermosetting resins or resins that are not fully polymerised, the resin is injected or drawn into the mould at a temperature where it is in a liquid state and upon impregnation of the preform, the resin is allowed to cure through polymerisation upon which the final composite material is obtained.

In various aspects of the invention, the resin of the invention or blends containing the resin of the invention is used in the production of composite structure manufactured by RTM or VARTM techniques. In preferred embodiments of the invention, the preform consists of fibres originating from a renewable source such as flax, wood, jute, hemp, kenaf, sisal, bamboo, coconut, pineapple, seaweed, seagrass, eel grass, algae, PLA and poly glycolic acid. In other embodiments, the preform can solely or together with fibres from a renewable source contain manmade fibres such as glass, carbon, ceramic, steel, aramid, polypropylene, poly ethylene terephthalate and nylon. In further embodiments, the preform can contain, also in addition to any of the fibres mentioned, fillers such as sand, stone, granite and gravel. The temperature, pressure and duration settings during the processing depends on the dimension of the composite structure, the fibre type in the preform, the resin composition and the polymerisation degree of the resin and can by those skilled in the art be adjusted as to obtain a fully impregnated and cured composite structure.

Specimen containing the resin of the present invention or polymer blends comprising resin of the present invention can be manufactured by utilising the resin in its polymerised state with processing techniques such as injection and extrusion moulding. The resin of the invention used in these techniques does in some embodiments contain short cut fibres and potentially fillers. The resin of the invention, the resin together with other liquid or solid resins or the resin premixed with others resins is added to the injection moulding or extrusion moulding equipment at a temperature where the added resin is processable in the equipment where it follows normal processing procedures as known to the skilled artisan followed by shaping into the desired geometry of the specimen.

In a plurality of aspects of the invention, fibrous structures containing the resin in a not fully polymerised stated are manufactured in what is often termed pre-preg. The fibrous structure is often similar to the fibrous preforms used in RTM and VARTM processing, but not limited hereto as other geometries are applicable as well as mixtures of different fibre types within the same fibrous structure can be utilised. The fibrous structure is wetted with the resin disclosed in the present invention or blends containing said resin by means of immersing the fibrous structure in the resin in liquid state, by pouring the resin onto the fibrous structures, spraying the resin onto the fibrous structure or any other technique that ensures complete wetting of the fibrous structure with the resin.

In some embodiments, the resin is in an unpolymerized state when wetting the fibrous structure. In these embodiments, the resin or fibres contain an initiator and potentially one or more catalysts for the resin polymerisation. Upon wetting the fibrous structure, the wetted structure can be exerted to a temperature and duration that leads to partial cure of the resin.

In other embodiments, the resin is partly polymerised when wetting the fibrous structure.

The present invention also comprises specimen made from or containing the pre-preg material described in the above. In advantageous embodiments, the fibrous structure contains natural fibres and/or glass fibres as strong adhesion between natural fibres and the resin is easily obtained compared to conventional resins.

Another embodiment of the invention is structures manufactured by employing the resin of the invention or blends containing the resin of the invention in a fibrous form by using an airlaid technique. In the airlaid technique, an adhesive in fibrous form is by means of air currents mixed with one or more other components, which preferably are fibrous. Particularly advantageous embodiments of the invention comprise other components that are hydrophilic fibres such as natural fibres and glass fibres as the resin exhibits strong bonding hereto. Upon mixing, the mixture of adhesive and other components is collected and shaped and is elevated to a temperature where the adhesive attains sufficient flow to wet the other components of the mixture. Upon heating, further shaping of the mixture can take place to yield the final structure. Heating can in some embodiments be prior to mixing the adhesive with the other components or prior to shaping the mixture. Subsequently, the airlaid structure can be exerted to hot pressing.

In other embodiments of the invention, airlaid structures are made using adhesive fibres made from the resin of the present invention or blends containing resins of the present invention and adhesive fibres containing other chemical compositions capable of being both within and outside the boundaries of the resin of the present invention. In preferred embodiments, any fibre not being within the boundaries of the present invention have a renewable content of at least 30% by weight, more preferably 50% and most preferably at least 80% by weight. Any for the adhesive fibre combinations mentioned in the above can be present as bicomponent and/or copolymer fibres.

Another embodiment of the invention is structures manufactured by employing the resin of the invention or blends containing the resin of the invention in a fibrous form by using a needle punch technique. In the needle punch process, an adhesive in fibrous form is needled into a structure of fibres or mats. Particularly advantageous embodiments of the invention comprise other components that are hydrophilic fibres such as natural fibres and glass fibres as the resin exhibits strong bonding hereto. Upon mixing, the mixture of adhesive and other components can be elevated to a temperature where the adhesive attains sufficient flow to wet the other components of the mixture to create a pre-form or final product.

In various embodiments of the invention, the resin is used as an adhesive for fibres in pultrusion. In pultrusion, fibres are drawn through the resin in a liquid state where the resin wets the fibres. Upon wetting, the fibres are normally consolidated and the resin is, if required cured. In preferred embodiments of the invention, the resin has a viscosity below 2000 mPa·s, more preferably below 1000 mPa·s and most preferably below 500 mPa·s at the processing temperature to ensure full and fast wetting of the fibres.

In other embodiments of the invention, polymerized resin is used as an adhesive for fibres in pultrusion. The resin can be in a fibrous form, but is not limited hereto.

In another embodiment of the invention, the resin is used as an adhesive in the production of receptacles for germination of seeds and growth of plants. The plant receptacle, sometimes referred to as plug, although it can have a plurality of geometries and sizes, contains a growth medium in which seeds can germinate and plants can grow and this growth medium should be hold together by one or more binders in order to make the receptacle self-supporting. The resin of the present invention is a suitable binder for the growth medium as it can offer degradability in nature and exhibits strong adhesion to a broad range of natural fibres and substances and is thus advantageous as adhesive for environmentally safe plant receptacles. Receptacles containing the resin of this invention can be manufactured by mixing the resin in its solid state with the growth medium capable of being present in either dry, humid or slurry state. Upon mixing, and potentially a predrying step, the mixture is heated to a temperature where the resin becomes liquid and thereby establishes contact points to the growth medium. If required, the mixture can undergo further thermal treatment to cure the resin. In other embodiments, the receptacle containing the resin is produced by pouring or spraying the resin onto the growth medium or letting the resin being pushed or drawn into the growth medium. After wetting the growth medium, if required, the mixture can undergo a subsequent heat treatment to cure the resin. In other embodiments of the invention, a gaseous component is added to the mixture of resin and growth medium when the resin is in a liquid, formable or flexible state in order to increase the porosity of the receptacle.

In other embodiments of the invention, the resin is mixed with the growth medium in a fibrous form. The mixing of the growth medium and the fibrous resin can be performed by different procedures. One example of a mixture procedure with dry fibres and growth medium using airlaid processing. Another example of a mixing procedure is mixing the growth medium in a moist, wet or slurry state with the fibrous resin. Upon mixing, the mixture can be dried using methods as centrifugation and heat. An advantage of using the resin in a fibrous shape is that heating to high temperatures that would sterilise the growth medium can be omitted.

In the following examples of resin compositions are provided to exemplify some embodiments of the invention. The examples are not covering all embodiments as only some of the suitable molecules in the resin are covered and the concentration range of the exemplified molecules can vary beyond the examples shown. Also the geometry of the resin can vary from that shown in the examples.

EXAMPLE 1

A round bottomed flask equipped with a stirrer is placed in an oil bath at 110° C. and 20 g lactide and 5 g PLA are added. After 10 minutes, the temperature is elevated to 165° C. and through stirring, the PLA is dissolved in the lactide. Upon dissolution, the temperature is reduced to 130° C. and 5 g glycolide and 1 g aconitic acid are added whereupon the mixture is stirred after which the content of the flask is allowed to cool to room temperature and this constitutes one part of a two component resin system.

In another flask, 50 µL of stannous octoate is mixed with 0.4 g of glycerol at room temperature. This constitutes the other part of the two component resin system.

EXAMPLE 2

A flask equipped with a stirrer is placed in an oil bath at 105° C. and 17 g L-lactide, 5 g meso lactide, 3 g glycolide, 1 g diethyl aconitate and 1.5 g aconitic anhydride are added under stirring. The content of the flask is allowed to cool to room temperature and this constitutes one part of a two component resin system.

In another flask, 20 µL of zinc octoate and 40 µL of stannous octoate are mixed with 0.6 g of glycerol and 0.5 g of propylene glycol with a molecular mass of 1000 Da at ambient temperature. This constitutes the other part of the two component resin system.

EXAMPLE 3

A flask equipped with a stirrer is placed in an oil bath at 105° C. and 20 g lactide, 3 g glycolide, 1 g gamma butyrolactone, 1 g ethyl cinnamate, 1.5 g aconitic anhydride, 0.2 g glycerol and 0.8 mL propylene glycol with a molecular mass of 2000 Da are added under stirring. After obtaining a homogeneous mixture, 30 µL of stannous octoate and 7 µL ethanol are added under stirring and the mixture is immediately cooled to provide a one component resin system.

EXAMPLE 4

A round bottomed flask equipped with a stirrer is placed in an oil bath at 110° C. and 20 g of lactide, 1 g 3-hydroxybutyrolactone, 2 g dimethyl itaconate, 0.5 g cinnamyl cinnamate and 5 g of PLA and 1 g of poly butylene succinate are added. After 20 minutes, the temperature is elevated to 165° C. and through stirring, the PLA and poly butylene succinate are dissolved in the lactide. Upon dissolution, the temperature is reduced to 130° C. and 5 g e-caprolactone and 1 g of muconic acid are added whereupon the mixture is stirred whereupon the content of the flask is allowed to cool to room temperature and this constitutes one part of a two component resin system.

In another flask, 60 µL of 4-(dimethylamino)pyridine is mixed with 0.4 g of isophorone diamine at room temperature. This constitutes the other part of the two component resin system.

EXAMPLE 5

To an aluminium container is added 50 g lactide, 20 g poly (lactic-co-glycolic acid), 0.7 g talc and 60 µL stannous chloride and the container is sealed and placed in an oven preheated 160° C. and is left there for 1.5 h whereupon the poly (lactic-co-glycolic acid) is dissolved in the lactide through stirring. The temperature of the oven is reduced to 140° C. and to the mixture, 1 g itaconic acid and 0.5 g fumaric are added under stirring. After 2 h at 140° C., 2 g tyrosine is added gradually under stirring. The mixture is then cooled and represents at partly polymerised one component system.

EXAMPLE 6

A flask equipped with a stirrer is placed in an oil bath at 105° C. and 15 g lactide, 2 g itaconic acid, 0.3 g lysine, 50 mg 4-pyrrolidinopyridine and 2 g jute fibre with a length between 100 and 500 µm are mixed under stirring. Upon mixing, the temperature is increased to 150° C. where it is kept for 3 h. To the mixture 0.5 g of Dupont Biomax Strong 120, 0.6 g poly ethylene glycol and 0.4 g methionine are added under stirring. The mixture is allowed to cool to ambient temperature and represents at partly polymerised one component system.

EXAMPLE 7

A flask equipped with a stirrer is placed in an oil bath at 120° C. and 15 g lactide, 5 g lactic acid, 2 g cinnamic acid, 0.5 g sinapyl alcohol and 30 µL stannous octoate are mixed under stirring and this temperature is kept for 3 h where after the temperature is increased to 160° C. for 2 h. 1 g tryptophan is added under stirring and after bubbling ceases, 15 mg mequinol is added as inhibitor and the reaction mixture is cooled. This part constitutes one part of a partly polymerised two component resin system.

In another flask, 40 µL of zinc octoate is mixed with 0.1 g glycerol, 0.4 g isophorone diamine and 0.5 g of propylene glycol with a molecular mass of 3000 Da at room temperature. This constitutes the other part of the two component partly polymerised resin system.

EXAMPLE 8

A Teflon container equipped with stirrer is placed in an oven at 120° C. and 15 g lactide, 5 g PLA, 2 g aconitic acid, 1 g of maleic anhydride, 0.5 g methyl itaconate, 0.5 g diethyl itaconate, 50 mg hydroquinone and 0.7 g straw with a size of 250-500 µm and 30 µL stannous octoate are mixed under stirring. After 15 minutes, the temperature is increased to 160° C. where the PLA dissolves in the mixture through stirring and the temperature is kept for 5 h. 3.3 g of tryptophan and 2 mg Macrolex® Red EG are added under stirring and the mixture is allowed to further polymerise at 160° C. for 2 h. The mixture is cooled and exemplifies a fully polymerised single component system.

EXAMPLE 9

A procedure similar to example 8 is followed except that 15 mg mequinol are added under stirring prior to cooling down the sample.

EXAMPLE 10

A flask equipped with a stirrer is placed in an oil bath at 120° C. and 5 g lactide, 2 g fumaric acid, 1 g itaconic acid, 0.8 g gallic acid and 0.2 mL glycerol are mixed under stirring. After 20 minutes, 10 g initiator containing poly lactic oligomers with a molecular weight of 1000-3000 Da are added and the temperature is increased to 170° C. where it is kept for 4 h where after 3 g PLA are added. When the PLA is dissolved by the aid of stirring the mixture is cooled.

EXAMPLE 11

A flask under nitrogen flow equipped with a stirrer is placed in an oil bath at 120° C. and 10 g lactide, 2 g glycolide, 2 g fumaric acid, 5 g aconitic acid and 20 µL 4-(dimethylamino)pyridine are mixed under stirring. The mixture is allowed to react for 3 h at 120° C. before the temperature is increased to 160° C. where 1 g of Nylon 6 is added under stirring so that the Nylon 6 dissolves in the mixture. After 5 h at 160° C., the temperature is reduced to 150° C. and 2 g bis(aminophenyl)methylphosphine oxide, 0.8 g Jeffamine D230 and 0.5 g 3 mm PLA fibres are added gradually under stirring. The temperature is kept at 150° C. for 1 h and the resin is cooled. Upon cooling the resin is crushed into granulates of a size smaller than 1 cm and is placed in a vacuum oven at 70° C. for 1 h.

EXAMPLE 12

A flask equipped with a stirrer is placed in an water bath at 70° C. and 10 g lactide, 1 g glycolide, 0.6 g Novozym 435, 200 mg inhibitor free methacrylic acid and 150 mL toluene as solvent are added to the flask. The contents of the flask are allowed to react for 48 h, whereupon 0.15 g tryptophan is added under stirring. The contents of the container are cast onto a glass plate which is placed in an vacuum oven at a pressure of 50 mbar and a temperature of 60° C. to allow the toluene to evaporate. Upon evaporation of the toluene, the polymer is recovered.

EXAMPLE 13

2 g of the resin of example 9 is at 180 C mixed with 8 g PLA resin using mechanical stirring. Upon mixing the resin is cooled.

EXAMPLE 14

In an extruder, 10 g of the resin of example 9, 10 g of poly butylene succinate and 80 g PLA are mixed and extruded into pellets.

EXAMPLE 15

In an extruder, 10 g of the resin of example 9, 10 g of poly butylene succinate, 80 g PLA and 15 g of 2 mm flax fibres are mixed and extruded into pellets.

EXAMPLE 16

A flask under nitrogen flow equipped with a stirrer is placed in an oil bath at 120° C. and 10 g lactide, 2 g glycolide, 2 g aconitic acid, 0.5 g cinnamic acid, 0.1 g sorbitol and 1 g maleic anhydride are mixed until at homogeneous liquid is obtained. Then 30 µL stannous octoate and 10 mg tert-butyl peroxide are added whereupon the temperature is increased to 155° C. and this temperature is kept for 3 h.

EXAMPLE 17

A flask equipped with a stirrer is placed in an oil bath at 140° C. and 20 g lactide and 0.1 g glucono delta-lactone are mixed until a homogenous mixture is obtained. Thereupon 10 µL stannous octoate are added under stirring. The mixture is allowed to react for 3.5 h.

EXAMPLE 18

A flask under nitrogen flow equipped with a stirrer is placed in an oil bath at 100° C. and 20 g L-lactide and 4 mL ε-caprolactone are added. When these components are molten and mixed, 30 µL 1-dodecanol and 45 µL stannous octoate are added whereupon the temperature is increased to 140° C. After 1 h at 140° C., 0.85 g cinnamic acid and 0.08 g dicumyl peroxide are added whereupon the temperature is increased to 165° C. 4 hours after increasing the temperature to 165° C. the resin is cast from the flask. From nuclear magnetic resonance it is found that 60% of the double bonds in cinnamic acid have reacted.

EXAMPLE 19

To a flask under nitrogen flow equipped with a stirrer in an oil batch at 165° C. is added 20 g lactide, 3 g aconitic acid 30 µL dodecanol, 45 µL stannous octoate and 0.31 g benzyl peroxide. The mixture is allowed to react for 12 h and is then cast from the flask. The cast resin is in this example referred to as pre-polymer.

In a new flask under nitrogen flow, 2 g of the prepolymer is mixed with 20 g lactide and 0.2 g of itaconic acid at 155° C. until a homogeneous mixtures is obtained.

EXAMPLE 20

10 g of the prepolymer in example 19 is in an extruder mixed with 40 g of PLA and extruded into new pellets.

The invention claimed is:

1. A resin comprising reaction products of:
a first composition of:
2-99.99% by weight of at least one of the following components:
monomers capable of forming cyclic monomers, said monomers capable of forming at least one of the following components: lactones, lactames, lactimes, dicyclic esters, cyclic esters, cyclic amides, cyclic aromatic sulphides, cyclic carbonates, 1,5-dioxepan-2-one or cyclic aromatic disulphides;
cyclic monomers;
oligomers produced from at least one of the following: monomers capable of forming cyclic monomers and cyclic monomers; and
polymers produced from at least one of the following: monomers capable of forming cyclic monomers and cyclic monomers,
wherein hydroxy acids cannot correspond to more than 50% by mole of the first composition and wherein the first composition is not solely comprised of polymers; and
a second composition of: 0.01-98% by weight of molecules capable of copolymerising with at least one of said components of the first composition into the backbone of the resin and containing at least one molecule with at least one carbon double bond and at least one more reactive group,
and wherein the resin is in a fully polymerised state.

2. A resin according to claim 1, wherein the first composition constitutes 10-99.99% by weight of the resin, and wherein the second composition constitutes 0.01-80% by weight of the resin.

3. A resin accordance to claim 1, wherein at least 40% by weight of the sum of the first composition and the second composition originate from a renewable origin being a naturally occurring resource selected from at least one of the following: plants, animals, and inorganic substances released through volcanic eruptions.

4. A resin according to claim 1, where the first composition or the second composition contain at least one molecule with a melting point below 70° C.

5. A resin according to claim 1, further comprising at least one of monomers, oligomers, or polymers not capable of copolymerising with at least one of the components of the first composition or the second composition.

6. A resin according to claims 1, further comprising fibres or fibrous material with a fibre length of 0.001 mm to 500 mm and/or fillers with a size between 0.001 mm to 100 mm and/or nanofillers with a size between 1 nm and 50,000 nm.

7. A resin according to claim 1, further comprising at least one cross linker capable of undergoing chemical reaction with at least one chemical group of either the first composition or the second composition or crosslink a polymer network through copolymerisation.

8. A resin according to claims 1, further comprising one or more of antioxidants, UV absorbers, colourants, fungicides, pesticides, antibacterials, antibiotics, fillers and/or flame retarders.

9. A structure containing the resin according to claim 1, wherein said structure is manufactured by means of one of the following processes: resin transfer moulding, injection moulding, extrusion moulding, pultrusion, needle punching, or airlaid processing.

10. A resin according to claim 2, wherein the first composition constitutes 25-99.99% by weight and wherein the second composition constitutes 0.01-50% by weight.

11. A resin according to claim 2, wherein the first composition constitutes 60-99.99% by weight and wherein the second composition constitutes 0.01-30% by weight.

12. A resin according to claim 3, wherein at least 60% by weight of the sum the first composition and the second composition originate from a renewable origin.

13. A resin according to claim 3, wherein at least 75% by weight of the sum the first composition and the second composition originate from a renewable origin.

14. A resin according to claim 6, wherein the fibres or fibrous material have a fibre length of 0.01 mm to 50 mm.

15. A resin according to claim 6, wherein the fibres or fibrous material have a fibre length of 0.05 mm to 10 mm.

16. A resin according to claim 6, wherein the fillers have a size between 0.001 mm to 5 mm.

17. A resin according to claim 6, wherein the nanofillers have a size between 1 nm to 10,000 nm.

18. A resin according to claim 1, with the proviso that when the first composition comprises one or more polymers produced from at least one of the following:
monomers capable of forming cyclic monomers and cyclic monomers the first composition also comprises one or more monomers capable of forming cyclic monomers.

* * * * *